United States Patent

Granzow et al.

[11] 4,072,098
[45] Feb. 7, 1978

[54] METHOD AND APPARATUS FOR EMBOSSING DIFFRACTION GRATINGS ON A RECORD MEDIUM

[75] Inventors: Robert H. Granzow, Miamisburg; Richard P. Marvin, West Carrollton, both of Ohio

[73] Assignee: NCR Corporation, Dayton, Ohio

[21] Appl. No.: 727,111

[22] Filed: Sept. 27, 1976

[51] Int. Cl.² .............................................. B44C 1/24
[52] U.S. Cl. ....................................... 101/32; 101/21; 101/109; 235/487; 340/146.3 P
[58] Field of Search ................. 101/109, 93.01, 93.37, 101/93.41, 93.42, 18, 19, 21, 27, 29, 32; 35/61.12 R, 61.12 N, 61.7 B; 350/162 R; 340/146.3 P

[56] References Cited

U.S. PATENT DOCUMENTS

| Re. 27,809 | 11/1973 | Drillick | 101/18 |
|---|---|---|---|
| 2,356,951 | 8/1944 | Runton | 101/27 X |
| 3,412,493 | 11/1968 | French | 340/146.3 P |
| 3,565,000 | 2/1971 | Yieser | 101/93.37 |
| 3,590,732 | 7/1971 | Kingsley | 101/109 X |
| 3,605,976 | 9/1971 | Angle | 101/21 |
| 3,768,619 | 10/1973 | Lewis | 101/18 X |
| 3,814,904 | 6/1974 | Russell et al. | 235/61.12 N X |
| 3,901,143 | 8/1975 | Alexander et al. | 101/109 X |

Primary Examiner—Edward M. Coven
Attorney, Agent, or Firm—J. T. Cavender; Albert L. Sessler, Jr.; Elmer Wargo

[57] ABSTRACT

A method and apparatus for embossing diffraction gratings on a record medium is disclosed. The diffraction gratings are embossed on a strip of aluminized plastic which is later imbedded in a record medium like a "credit card" for use in a security system which utilizes data recorded in the form of diffraction gratings and data recorded in magnetic stripes on the card. The apparatus utilizes embossing masters in the form of "type bars" or grating bars which are selectively indexed to an embossing station where the embossing takes place under controlled heat and pressure conditions. A special method or layout scheme is used in laying out the embossing masters on the grating bars.

12 Claims, 11 Drawing Figures

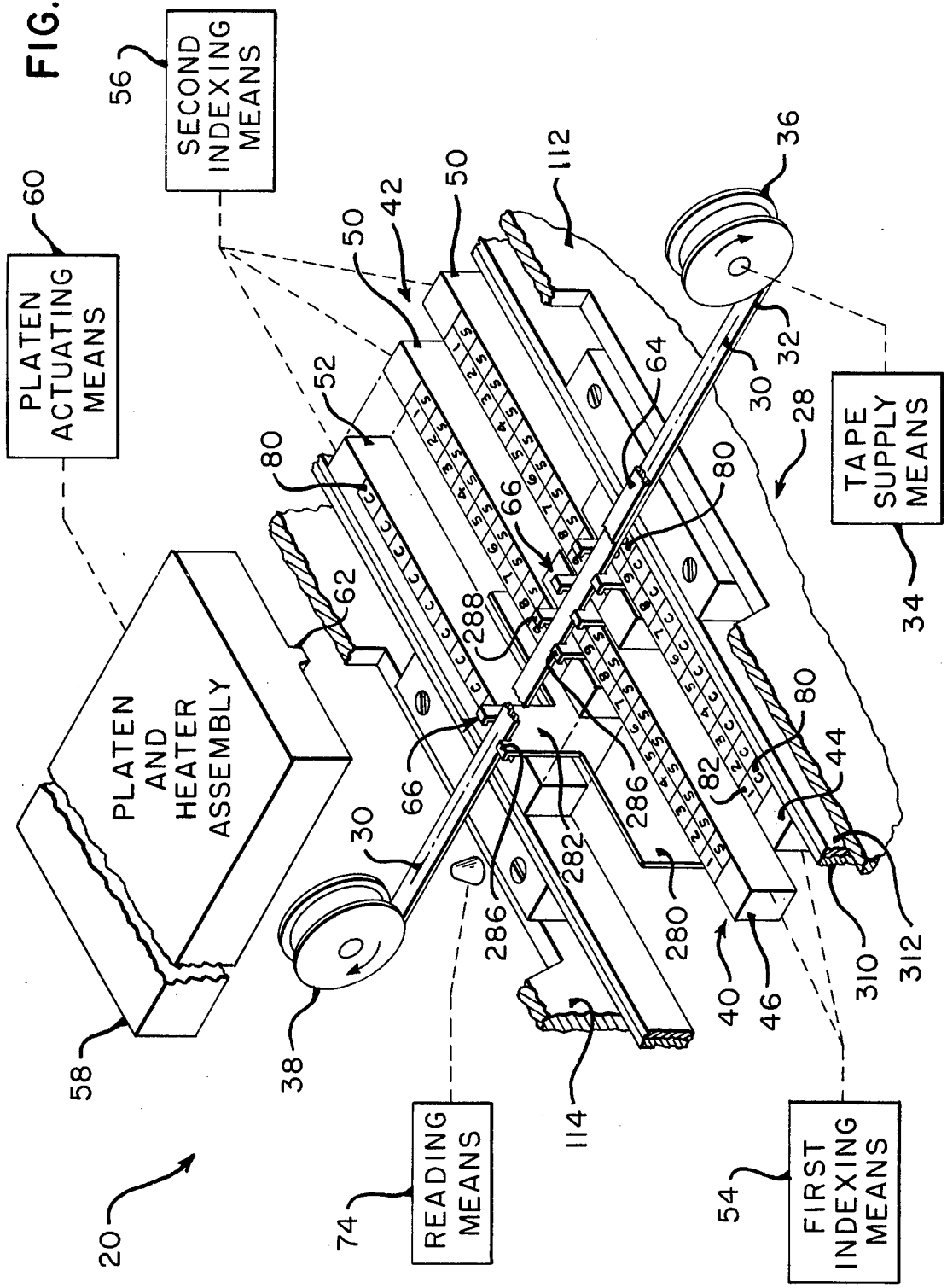

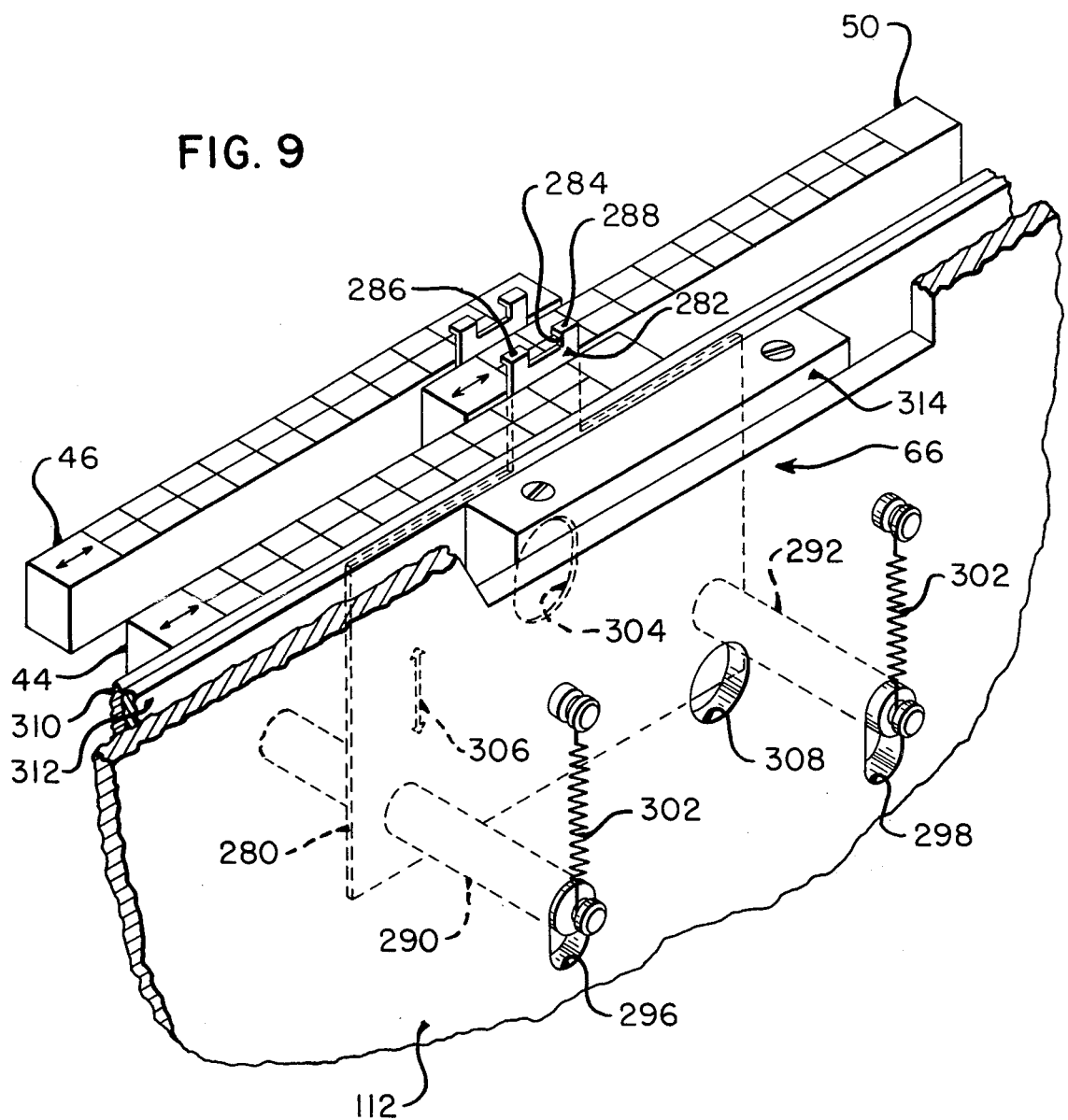

METHOD AND APPARATUS FOR EMBOSSING DIFFRACTION GRATINGS ON A RECORD MEDIUM

BACKGROUND OF THE INVENTION

This invention relates to a method and apparatus for embossing diffraction gratings in conformance with a predetermined code on to a strip of reflective plastic which is later imbedded in a record medium like a "credit card" for use in security systems to identify the user of the card.

This invention is related to copending U.S. applications, Ser. No. 588,937 filed on June 20, 1975, Ser. No. 611,377 filed on Sept. 8, 1975, and Ser. No. 611,378 filed on Sept. 8, 1975, all of which said copending applications have been assigned to the same assignee as this application.

Recent developments in security or financial systems, credit systems, funds transfer systems, and the like, rely heavily on the use of record media or "credit cards" having magnetic stripes or tracks thereon with various data such as account number, credit limits, credit status, credit available for use, and the like, being recorded magnetically on the stripes. Such systems have to be designed to avoid or minimize the fraudulent use of such record media or credit cards.

One of the ways in which fraudulent use of such credit cards is made is to counterfeit the cards by mass reproduction techniques which "skim" or transfer the data magnetically recorded on a valid card to a fraudulent one.

The problem of trying to prevent the unauthorized duplication of or use of valid credit cards used in financial, credit or security systems, and the like, is a very extensive one, as evidenced by the variety of different techniques discussed in said copending application Ser. No. 588,937.

Said copending application, Ser. No. 611,377, discloses a method and apparatus for producing superimposed optical or diffraction grating masters, which in turn, are used to produce superimposed gratings for use in a record medium or "credit card", and said copending application is incorporated by reference herein.

Said copending application, Ser. No. 611,378 discloses a special type of reader which is used for reading a record medium containing coded data in the form of diffraction gratings.

Said copending applications Ser. Nos. 588,937 and 611,377 disclose methods for producing "credit cards" having diffraction gratings thereon by techniques which are essentially manually operated.

In order to produce "credit cards" of the types disclosed in said copending applications in the large quantities which are necessary for acceptance by the banking industry, for example, it is necessary that the method for producing the "credit cards" be automated to a larger extent. Some prior art general embossing techniques are shown in U.S. Pat. Nos. 3,502,761, 3,636,147 and 3,861,299.

SUMMARY OF THE INVENTION

The present invention relates to a method of laying out diffraction grating masters so as to facilitate the production of "credit cards" having diffraction gratings thereon and to an apparatus for embossing the optical or diffraction gratings on to a length or strip of reflective deformable material like plastic which is later imbedded in the "credit card". The apparatus for producing diffraction gratings on a length of plastic includes: an embossing station having an embossing line; a plurality of type or grating bar means with each said grating bar means having grating patterns thereon; means for indexing the bar means in a direction which is perpendicular to the embossing line to position selected ones of the grating patterns at the embossing station; and platen means for embossing the grating patterns on the length of plastic. The method includes a special method or layout scheme for laying out the diffraction grating masters on a plurality of grating bar means so as to facilitate the automatic production of a large number of embossed lengths of plastic which are later imbedded in a record medium or "credit card".

BRIEF DESCRIPTION OF THE DRAWING

FIG. 1 is a schematic view, in perspective, of an apparatus which embodies the principles of this invention, showing an embossing station including an embossing line along which a tape or length of deformable material is positioned, first and second groups of grating bar means having diffraction grating masters formed thereon, first and second indexing means for respectively indexing selected grating masters on said first and second groups of grating bar means to said embossing line, a platen and heater assembly including platen means, platen actuating means for moving the platen means into operative engagement with the length of a deformable material;

FIG. 9 is an enlarged view, in perspective, of a portion of the stripper means shown in FIG. 1.

DETAILED DESCRIPTION OF THE INVENTION

Figure 2B:
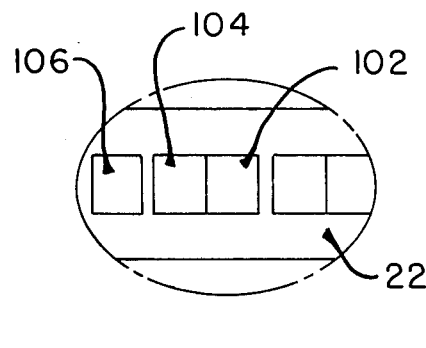
FIG. 2B is an enlarged area of a portion of the "credit card" shown in FIG. 2.

Before proceeding with a detailed explanation of the apparatus of this invention, it would appear beneficial to discuss the apparatus designated generally as 20 in a general way.

The apparatus 20 is used for embossing diffraction gratings on a thin strip 22 (FIG. 2) of reflective deformable material or tape, like plastic, which is embedded or sandwiched between protective layers of plastic to form a record medium or "credit card" 24 which may be used in systems such as automatic cash dispensing systems, funds transfer systems, etc., of the type disclosed in said copending patent applications enumerated earlier herein. In general, the credit card 24 may also have a magnetic stripe 26 thereon for receiving data in magnetic form which may be compared with selected portions of the data represented by the diffraction gratings on the strip 22 (FIG. 2) to determine the validity of the card 24 when it is used in an automatic cash dispensing system, for example. A suitable reader for reading both the magnetic data on stripe 26 and the diffraction gratings on strip 22 is shown in said copending application, Ser. No. 611,378.

The apparatus 20 (FIG. 1) includes an embossing station 28 having an embossing line 30 along which line a length 32 of reflective deformable plastic material is fed by conventional tape supply means 34 which includes a tape supply reel 36 and a take up reel 38 on which the length 32 is wound after the diffraction gratings are embossed thereon. The tape supply means 34 feeds the length 32 of material in lengths longer than the length of strip 22 shown in FIG. 2 so as to provide cut-off spaces between successive lengths 32.

The apparatus 20 (FIG. 1) also includes a plurality of grating bar means made up of a first group 40 of grating bar means and a second group 42 of grating bar means which are slidably supported on an anvil or support (not shown) but included in the embossing station 28. The first group 40 of grating bar means includes grating bars 44 and 46, with several grating bars like 46 being eliminated from the drawing to simplify it. The second group 42 of grating bar means includes grating bars 50 and 52, with several grating bars like 50 being eliminated from the drawing to simplify it. The first group 40 of grating bar means is selectively positioned with reference to the embossing line 30 by a first indexing means 54, and the second group 42 of grating bar means is similarly, selectively positioned with reference to the embossing line 30 by a second indexing means 56 in opposed relationship to the first indexing means 54 so as to position selected ones of diffraction grating masters on the grating bars 44, 46, 50 and 52 at the embossing line 30 in preparation for the embossing operation.

After the length 32 of material is positioned at the embossing line 30, a platen means 62 in a platen and heater assembly 58 is lowered by a platen actuating means 60 to bring the platen means 62 into operative engagement with the length 32 and the diffraction gratings on the grating bars 44, 46, 50, 52 to emboss the length 32 of deformable material as will be described in detail hereinafter. A thin layer 64 of deformable plastic material overlies the length 32 during the embossing operation to equalize the pressures on the length 32 due to the individual platens of the platen means 62 as will be described in detail hereinafter. After the embossing operation, when the platen means 62 is raised, spring-loaded, stripper means 66 are utilized to strip the length 32 from the grating bars 44, 46, 50 and 52, permitting the length 32 to be indexed by winding the embossed length 32 on the take up reel 38 and presenting a new length 32 of material to be positioned at the embossing station 28 for embossing.

The data to be embossed on a length 32 of deformable material is entered on a keyboard entry means 68 (FIG. 3) and is encoded by an encoding means 70 and is routed via a control processing unit 72 to the first and second indexing means 54, 56 for setting the first and second groups (40, 42) of grating bar means as previously described. The platen actuating means 60 and the tape supply means 34 are also under the control of the control processing unit 72. A reading means 74, under the control of the control processing unit 72, reads the data which has just been embossed as the length 32 is wound on the take up reel 38, and feeds the data read to a conventional comparator means 76 which compares the data actually embossed on the length 32 with what was entered on the keyboard entry means 68 to insure that the correct data is being embossed thereon. An error display 78 is used to indicate a mismatch of data to enable an operator to check on the apparatus 20. Because the control circuit shown in FIG. 3 may be conventional, it is not described in any further detail.

The layout of the diffraction gratings on the first and second groups 40, 42 of grating bar means is an important feature of this invention as it facilitates the automated production of the strips 22 (FIG. 2) used in the credit card 24.

Figure 4:
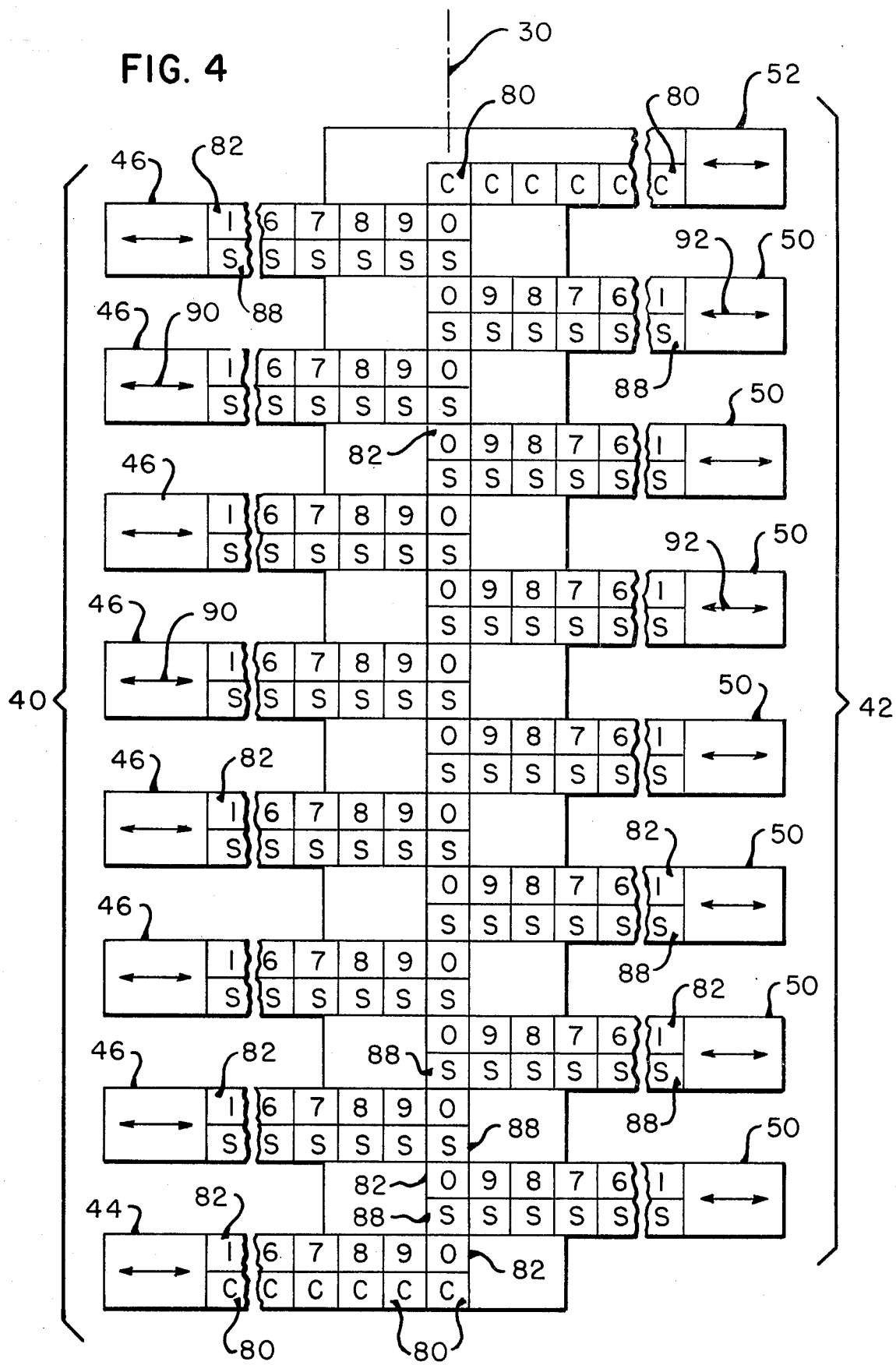
FIG. 4 is a schematic plan view of the grating bar means shown in FIG. 1.

FIG. 4 is a schematic, plan view of the first and second groups 40, 42 of grating bar means shown in FIG. 1 to illustrate how the diffraction gratings are assigned thereto. For the moment, assume that the letter "C", also marked 80 in FIG. 4, represents a control grating, and the square marked "1", also marked 82, represents a grating for the digit 1, and the remaining squares marked 6 through 0 contain diffraction gratings corresponding to the digits 6 through 9 and zero. A portion of the grating bars 44, 46 is broken away to facilitate the showing; however, the diffraction gratings for the digits 2 through 5 would be located on the part of each grating bar which is omitted from the drawing.

Figure 5:
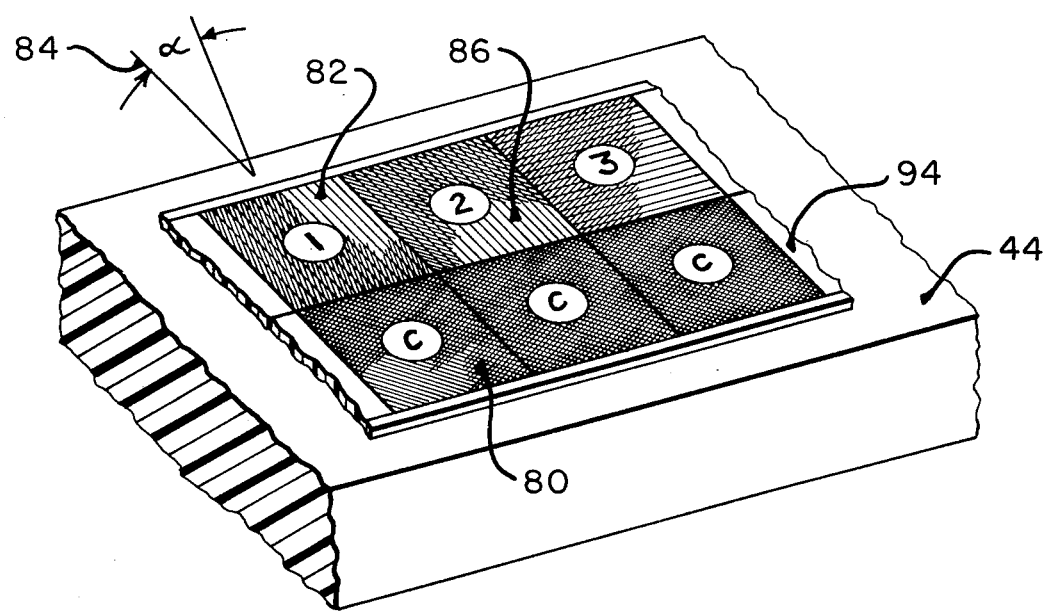
FIG. 5 is an enlarged perspective view of one of the grating bars shown in FIG. 1, showing the arrangement of the diffraction gratings thereon.

FIG. 5 is an enlarged perspective view of a portion of the grating bar 44 showing the arrangement of the diffraction gratings thereon. In the embodiment shown, the diffraction gratings are of the superimposed type. The diffraction gratings may be composed of, for example, a line pitch of 350 lines per mm. and a line pitch of 600 lines per mm. at varying angles with reference to a reference line. For example, the control grating "C", also marked 80 in FIG. 5 may be comprised of a first diffraction grating having 600 lines per mm. and positioned at an angle $\alpha$ of 67°30' with reference to line 84, and a second grating having 600 lines per mm. but positioned at an angle $\alpha$ of 150° with respect to reference line 84 which is perpendicular to the length of the grating bar 44. The diffraction grating 82 representing the digit 1 may be comprised of a first grating having a line pitch of 350 lines per mm. which is positioned at an angle $\alpha$ of 0° with respect to line 84, and a second grating having a line pitch of 600 lines per mm. which is positioned at an angle $\alpha$ of 22°30' with respect to line 84. The diffraction grating 86 representing the digit 2 may be comprised of a first grating having a line pitch of 350 lines per mm. which is positioned at an angle $\alpha$ of 0° with respect to line 84, and a second grating having a line pitch of 600 lines per mm. which is positioned at an angle $\alpha$ of 150° with respect to line 84. The diffraction grating marked wih an "S" (also numbered 88) on grating bar 50, for example in FIG. 4 represents a diffraction grating which is used as a space or clocking pulse to provide a separation between the diffraction gratings which are data digits like 1, 2, 3, etc. The space diffraction grating 88 is comprised of first and second gratings, both of which have a line pitch of 600 lines per mm., with the first and second gratings being positioned respectively at angles α of 112°30' and 150° with respect to line 84 (FIG. 5).

It should be pointed out that the specific line pitches and orientation angles with respect to line 84 (FIG. 5) for the diffraction gratings mentioned in the previous paragraph are merely illustrative of the type of coding which may be employed. Naturally, the reading means like 74 in FIG. 1 or a reader not shown but used with the credit card 24 (FIG. 2) would have to have its detectors oriented in accordance with the scheme or pattern used to produce the coding scheme for the characters shown in FIGS. 1, 4 and 5. The detectors in the reading means like 74 may be oriented to receive first order diffraction beams which result from a beam of light striking the length 32 (FIG. 1) and being "reflected" back to the detectors.

From FIG. 4, the general overall design of the layout of the first and second groups 40, 42 of grating bar means becomes apparent. The grating bar 44 has a diffraction grating 82 thereon, representing a character, and a diffraction grating 80 representing a control mark which indicates the start or end of a new series of data, as for example, the start of a new credit card 24 being read. The grating bars 46, 50 similarly have thereon diffraction gratings 82 representing characters and diffraction gratings 88 representing a space or "clock pulse" between characters in side by side relationship when viewed from the embossing line 30. The grating bar 52 simply has diffraction gratings 80 representing control marks which indicate the start or end of a new series of data. The grating bars 44, 46 are shown in their leftmost positions as viewed in FIG. 4, and the grating bars 50, 52 are shown in their rightmost positions. As shown, the data "0" for each of the grating bars 44, 46 and 50 is positioned at the embossing line 30. The first indexing means 54 (FIG. 1) is used to reciprocate the first group 40 of grating bar means to the embossing line 30 along the direction shown by arrows 90 and the second indexing means 56 is used to reciprocate the second group 42 of grating bar means along the direction shown by arrows 92, as will be described hereinafter. In the embodiment shown, 15 different characters can be printed on a strip 22 (FIG. 2) although this number can be changed to suit a particular application. While the grating bars 44, 46, 50, and 52 are shown as contacting each other in side by side relationship in FIG. 4, they are actually spaced somewhat to allow room for the stripper means 66 (FIG. 1) to be interspersed between the grating bars; the stripper means 66 facilitate the removal of the length 32 after the embossing operation and align the length 32 along the embossing line 30, as will be described in more detail hereinafter.

As alluded to earlier herein, the length 32 (FIG. 1) of reflective, deformable material is made of plastic like Mylar which is a trademark for a plastic material having a thin layer of aluminum deposited thereover. In the embodiment shown, the width of length 32 is about 0.250 inch and the thickness thereof is about 0.002 inch. When the length 32 is positioned at the embossing line 30 (FIG. 1) the reflective side of the length 32 is positioned down to engage the diffraction gratings on the grating bars 44, 46, 50 and 52. The diffraction gratings like 80, 82 on these grating bars are formed on a thin sheet 94 (FIG. 5) of metal which is secured to the associated grating bar 44, 46, 50 and 52. The techniques for forming the diffraction gratings on the sheet 94 include photographic, chemical etching and electrodeposition techniques which are fully explained in said copending application Ser. No. 611,377, which is incorporated by reference herein.

Figure 2A:
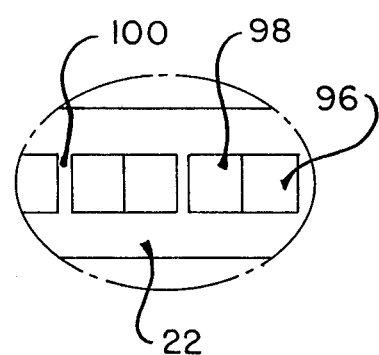
FIG. 2A is an enlarged area of a portion of the "credit card" shown in FIG. 2 to show the arrangement of the diffraction gratings and associated control gratings.
Figure 2:
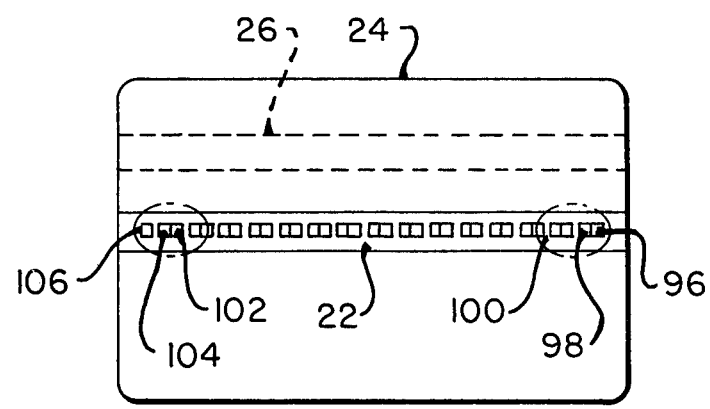
FIG. 2 is a plan view of a record medium like a "credit card", showing the diffraction gratings on a length of tape resulting from the operation shown in FIG. 1 and as the gratings are imbedded in the "credit card"

The diffraction gratings which are embossed on the length 32 (FIG. 1) are later cut into strips 22 for embedding in a credit card 24 as shown in FIG. 2. It is preferred to have the reflective side of the strip 22 face upwards as viewed in FIG. 2, and the strip 22 may be embedded in the card 24 by covering it with a clear layer of plastic. Notice that the diffraction gratings like 96, 98, appear in pairs with a space 100 between adjacent pairs as better seen in FIG. 2A. The diffraction gratings 96, 98 on the strip 22 are formed by the diffraction gratings 80, 82, respectively, on the grating bar 44 (FIG. 4). Similarly, the diffraction gratings 102, 104 on the strip 22 are formed by the diffraction gratings 88, 82 respectively, on the grating bar 46 (FIG. 4). The diffraction grating 106 on the strip 22 is formed by the diffraction gratings 80 on the grating bar 52 (FIG. 4).

Figure 6:
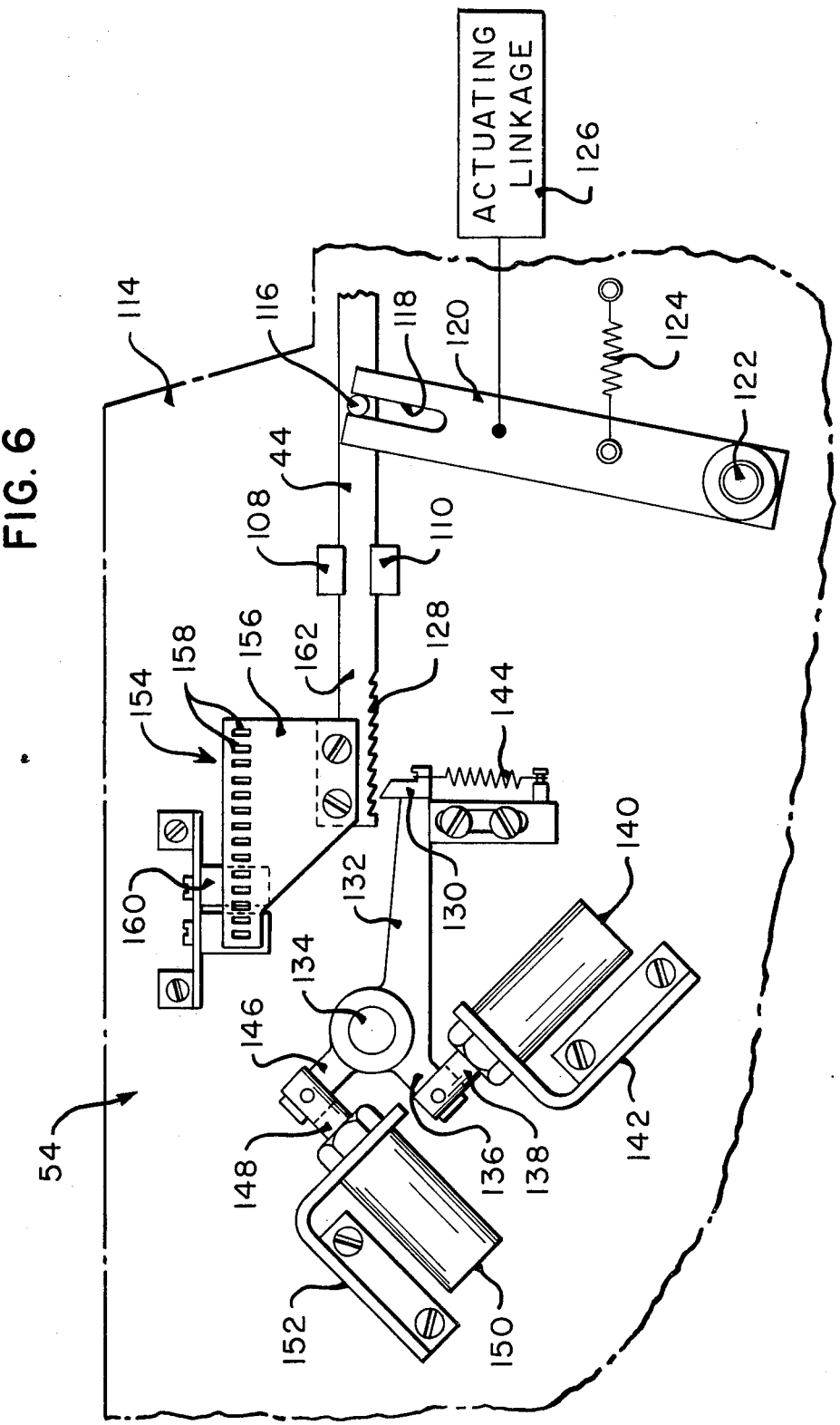
FIG. 6 is a side view of the first indexing means shown in FIG. 1 for indexing the first group of grating bar means to the embossing line.

The first indexing means 54, shown only as a block diagram in FIG. 1, is shown in more detail in FIG. 6. The second indexing means 56 is identical in operation to the first indexing means 54; therefore, only the latter one need be described in detail.

In order to simplify the explanation of the first indexing means 54, only one grating bar 44 is shown in FIG. 6. The grating bar 44 is mounted in conventional guides 108 and 110, shown only in block form, to slidably mount the grating bars like 44, 46 in the side frames 112, 114 (FIG. 1) of the apparatus 20. Each grating bar 44, 46 has a short pin 116 which coacts with a slot 118 in one end of a restoring lever 120 whose other end is pivotally mounted on a rod 122 supported in the side frames 112, 114. A spring 124 is used to bias the lever in a clockwise direction as viewed in FIG. 6. Conventional actuating linkage 126 (shown only as a block in FIG. 6) is operatively connected to the restoring lever 120 to pivot the lever in a counterclockwise direction as viewed in FIG. 6 to move the associated grating bar 44 to the left or home position so as to position the diffraction grating 82 corresponding to the digit "0" (at the embossing line 30 shown in FIGS. 1 and 4). The grating bar 44 has a series of ratchet teeth 128 on the end thereof, and the teeth 128 coact with a pawl member 130 which is located on a lever 132, which in turn is pivotally mounted on a rod 134 which is supported in the side frames 112 and 114. The lever 132 has an arm 136 which is pivotally joined to the operating plunger 138 of a solenoid 140 which is mounted on a suitable stationary bracket 142. The pawl member 130 is biased out of engagement with the associated ratchet teeth 128 by a tension-type spring 144. When the solenoid 140 is energized, the lever 132 is pivoted in a counterclockwise direction as viewed in FIG. 6 to pivot the associated pawl member 130 into engagement with the associated ratchet teeth 128. There is one such lever 132 provided for each grating bar 44, 46 of the first group 40 of grating bar means; however the arms and solenoids associated with the levers 132 are offset so as to afford compactability. For example, the second lever 132, directly behind the lever 132 shown in FIG. 6, has an arm 146 which is pivotally joined to the operating plunger 148 of a solenoid 150 which is fixed to a suitable bracket 152. Alternate levers 132 have their associated arms 136, 146 alternated to afford compactability.

Figure 3:
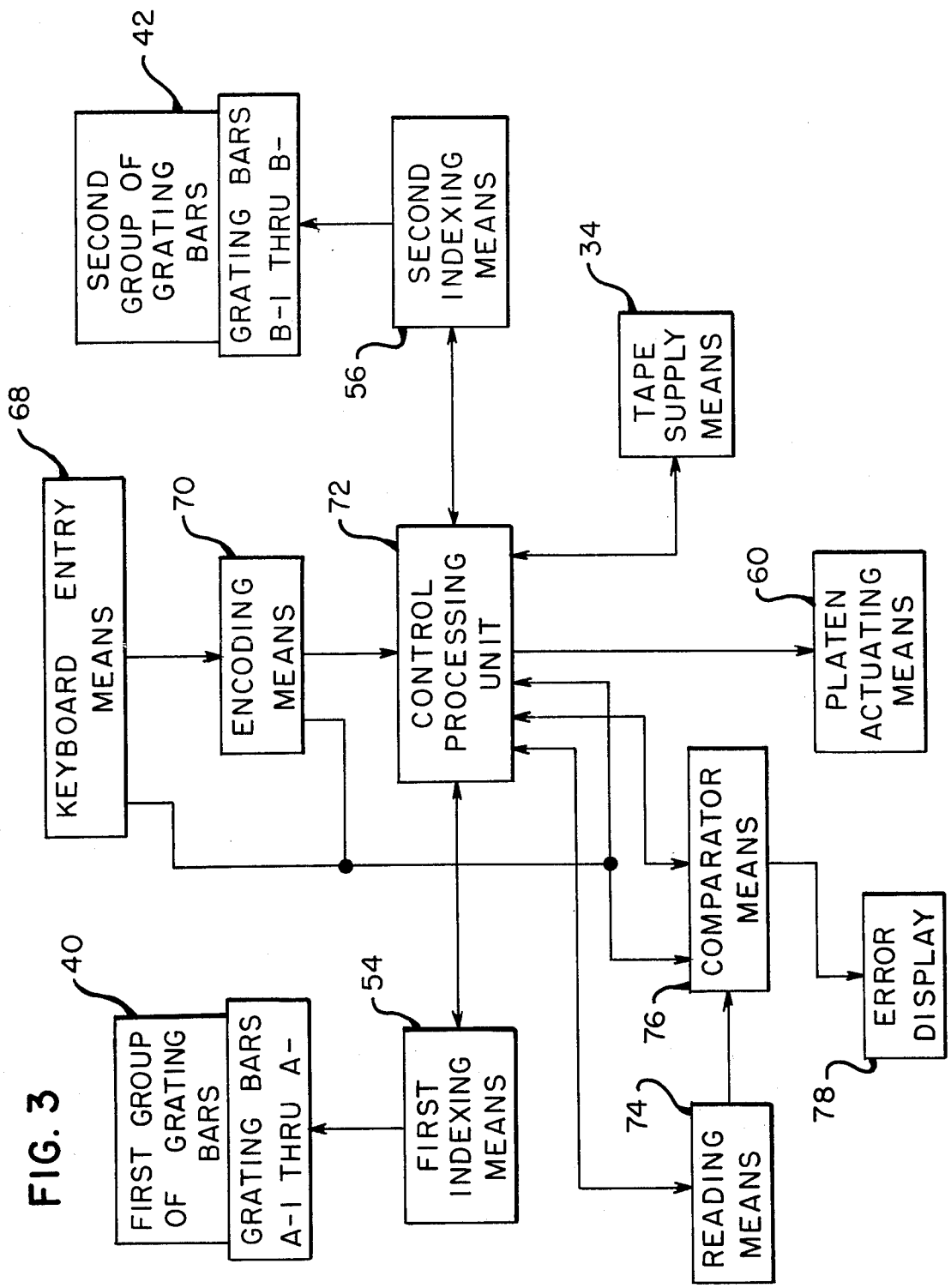
FIG. 3 is a block diagram of a control circuit used with this invention.

Each of the grating bars 44, 46 has its own detecting means 154 (FIG. 6) associated therewith to position the associated grating bar in accordance with the data entered on the keyboard means 68 (FIG. 3). The detecting means 154 includes a plate 156 which is fixed to the associated grating bar 44, and it has a plurality of holes 158 therein, with one hole 158 corresponding to each character like 82 (FIG. 4) on the grating bar 44. Similarly, one tooth on the teeth 128 on the bar 44 is provided for each character to be embossed. A conventional photodetector means 160 (including a light emitting diode and associated detector) is positioned relative to the holes 158 in the plate 156 so as to generate a pulse each time a hole 158 passes the photodetector means 160. For example, when the actuating linkage 126 pushes the grating bar 44 to the left (as viewed in FIG. 6), the grating bar is pushed beyond the first position, and as the grating bar 44 begins to move to the right under the influence of the spring 124 and actuating linkage 126, one of the holes 158 will coact with the photodetector means 160 to produce a first pulse. If that particular grating bar 44 is to produce a character "0", the appropriate solenoid 140, 150 will be energized, causing the lever 132 to pivot and bring the associated pawl member 130 into engagement with the first tooth 162 on the grating bar 44, thereby positioning the diffraction grating 82 at the embossing line 30 (FIGS. 1 and 4). Similarly, if a "9" is to be embossed at the embossing line 30, the appropriate solenoid like 140 will be energized after two pulses from the associated photodetector means 160 to stop the movement to the right of the grating bar 44. When moving towards the right as viewed in FIG. 6, the grating bar 44 moves at a constant velocity under the influence of the spring 124 and actuating linkage 126 which is conventional and includes a cam and lever arrangement for providing the constant velocity. The first indexing means 54 is under the control of the control processing unit 72 which may be conventional. Because the second indexing means 56 for indexing the second group 42 of grating bar means operates in exactly the same manner as was just described, the second indexing means 56 will not be described in any further detail.

Figure 7:
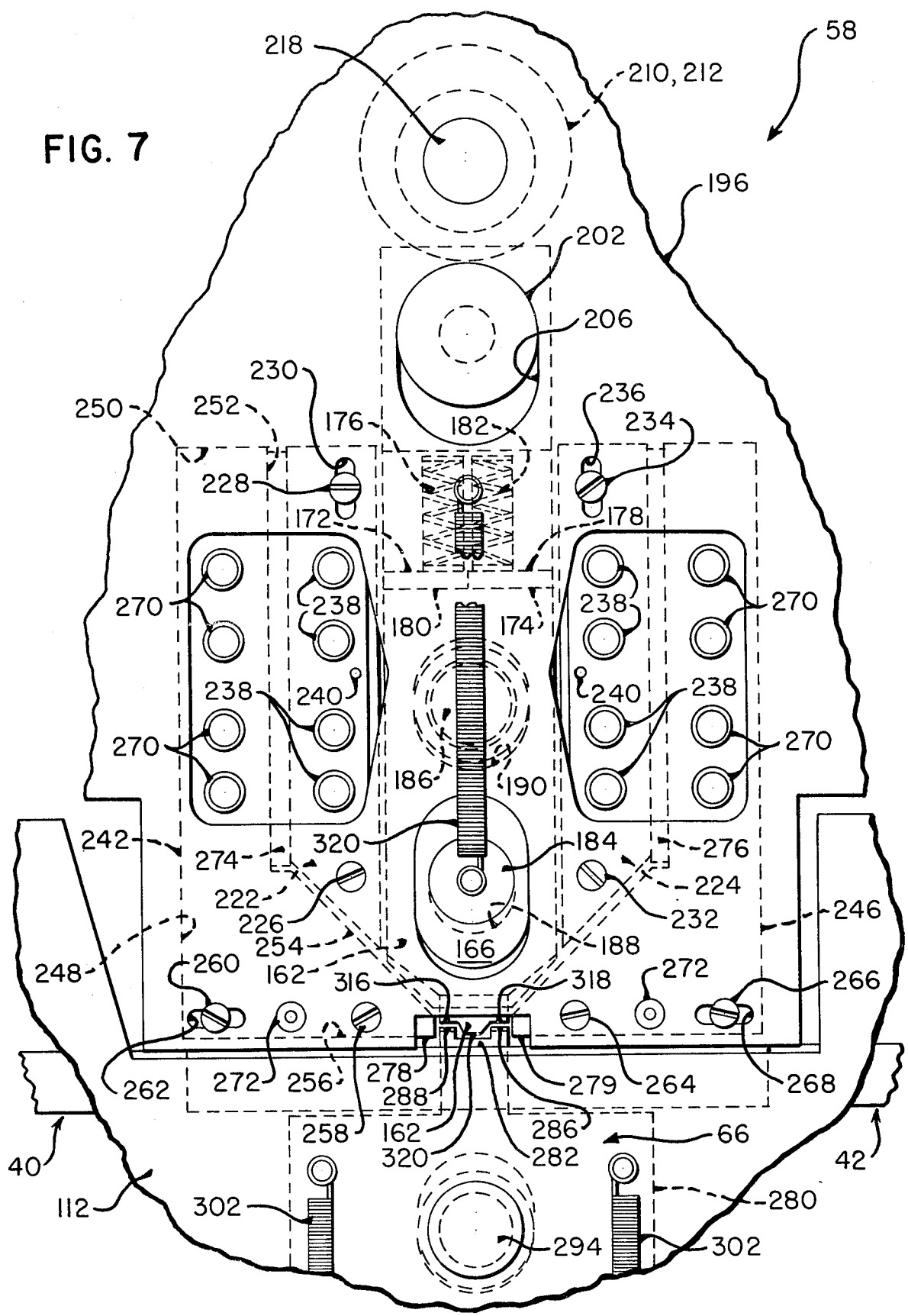
FIG. 7 is a side view in elevation of the platen and heater assembly shown in FIG. 1.
Figure 8:
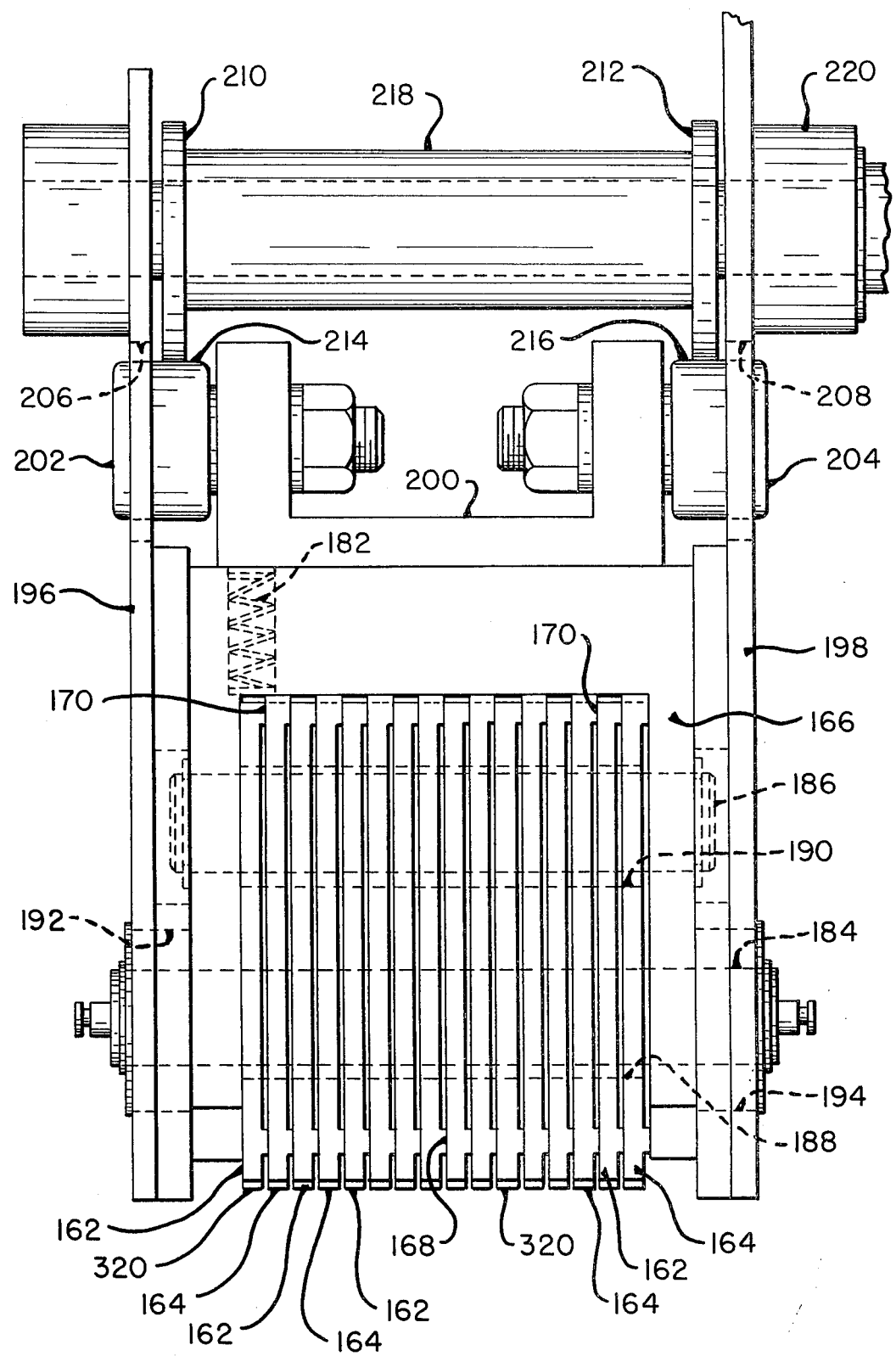
FIG. 8 is a side view, in elevation, of a portion of the platen and heater assembly, and the platen actuating means shown in FIG. 1.

The platen and heater assembly 58 shown in diagrammatic form in FIG. 1 is shown in more detail in FIGS. 7 and 8. As alluded to earlier herein, there is one individual platen for each grating bar like 44, 46, 50 and 52, as for example, platen 162 for grating bar 44, and platen 164 (FIG. 8) for grating bar 52. The platens 162, 164 are slidably mounted within an inverted "U" shaped member 166 shown in FIG. 8. Each platen 162, 164 has spaced bosses 168, 170 (FIG. 8) thereon to provide for bearing surfaces to minimize the sliding friction between adjacent platens. Those platens marked 162 are associated with the first group 40 of grating bar means and those platens marked 164 are associated with the second group 42 of grating bar means. Those platens marked 162 have a raised area 172 (FIG. 7) and a recessed area 174. The raised areas 172 contact a plurality of compression-type springs 176 (FIG. 7) located in the "U"-shaped member 166 to resiliently bias the platens 162 in a downward direction as viewed in FIG. 7. There is one such spring 176 provided for each platen 162. Similarly, those platens marked 164 have a raised area 178 and a recessed area 180 which are oppositely situated from the corresponding areas of the platens 162 to provide for independent action or movement of the platens 164 and 162. A separate plurality of springs 182 is similarly provided to resiliently bias the platens 164 in a downward direction as viewed in FIG. 7.

The platens 162, 164 are retained in the "U"-shaped member 166 by two mounting rods 184 and 186 which are mounted in the "U"-shaped member 166, as is best shown in FIG. 8. The platens 162 and 164 have elongated slots 188 and 190 therein which permit the platens 162, 164 to move vertically but which prevent them from moving laterally as viewed in FIG. 7 with regard to the "U"-shaped member 166. The rod 184 passes through the slots 188 and the rod 186 passes through the slots 190 when in the assembled relationship shown. The rod 184 is held in elongated slots 192 and 194 (FIG. 8) in stationary side frames 196 and 198 respectively, which are conventionally secured in spaced parallel relationship with each other. The slots 192, 194 enable the lower end of the "U"-shaped member 166 to be reciprocated vertically, but not displaced laterally as viewed in FIG. 7. The upper end of the "U"-shaped member 166 has a "U"-shaped member 200 which is secured thereto as shown. A pair of axially aligned rollers 202 and 204 are conventionally, rotatably mounted in the "U"-shaped member 200 as is best seen in FIG. 8. The roller 202 is positioned in an elongated slot 206 in the side frame 196 and the roller 204 is similarly positioned in an elongated slot 208 in side frame 198 to permit the "U"-shaped member 166 to be reciprocated in a vertical direction without being displaced laterally as viewed in FIG. 7.

The "U"-shaped member 168 with the platens 162, 164 therein is reciprocated in a vertical direction by a pair of cams 210, 212 which engage the rollers 202, 204 at contact areas 214, 216 respectively, as is best seen in FIG. 8. The cams 210, 212 have a centerline which is slightly offset relative to the longitudinal axis of the shaft 218 to which they are secured so as to obtain the necessary "throw" of the platens 162, 164 during the embossing operation. The shaft 218 is rotatably supported in the side frames 196, 198 and is operatively connected to a conventional slip clutch and driving arrangement 220 which are part of the conventional platen actuating means 60 shown in FIG. 1 and which are under the control of the control processing unit 72.

As alluded to earlier herein, the platen and heater assembly 58 (FIG. 1) contains heating elements for heating the platens 162, 164, and the grating bars 44, 46, 50 and 52. The assembly for heating the platens is best shown in FIG. 7 and includes aluminum blocks 222 and 224 which are secured to the side frames 196 and 198. The lower end of the block 222 is secured to the side frames 196, 198 by screws, like 226 (as viewed in FIG. 7), and the upper end is secured by screws like 228 which are mounted in appropriate slots like 230 to enable the block 222 to expand in an upward direction when heated. Similarly, the lower end of block 224 is secured to the side frames 196, 198 by screws like 232, and the upper end of the block 224 is secured by screws (like screw 234) passing through elongated slots 236 in the side frames 196, 198 to enable the block 224 to expand in an upward direction when heated. The blocks 222 and 224 are located on opposed sides of the platens 162, 164, are slightly spaced therefrom, and extend along the entire width of the "U"-shaped member 166 to heat the platens contained therein. The block 222 has rod-like heater elements 238 whose lengths extend into the platen of the drawing of FIG. 7 to heat the entire width of the block. A conventional thermistor 240 is used to sense the temperature of the block 222 and maintain it at a predetermined level, as will be described hereinafter. Similarly, the block 224 has heating elements 238 and a thermistor 240.

The platen and heater assembly 58 also includes aluminum heating blocks 242 and 246 which have the general cross-sectional shape shown in FIG. 7. Block 242, for example, is bounded by the dashed lines 248, 250, 252, 254 and 256, and block 246 has a cross-sectional shape which is the mirror image of block 242. The blocks 242 and 246 similarly extend along the width of the "U"-shaped member 166 (FIG. 8) to heat the grating bars 40, 46, 50 and 52 covered thereby. The lower end of the block 242 is secured to the side frames 196, 198 by screws 258 (FIG. 7), and screws 260 which are mounted in appropriate slots like 262 in side frame 196 to enable the block 242 to expand, when heated, in a lateral direction (to the left as viewed in FIG. 7). The block 246 is similarly mounted by screws 264 and screws 266 mounted in slots, like 268, to enable the block 246 to expand, when heated, in a lateral direction and to the right as viewed in FIG. 7. The block 242 has appropriate holes drilled therein to receive the rod-like heating elements 270 whose lengths extend into the plane of the drawing of FIG. 7 to heat the first group 40 of platen means including type bars 44, 46. A thermistor 272 is used to sense the temperature of the heated block 242 so as to maintain a predetermined temperature of the type bars 44, 46. The block 246 has a similar group of rod-like heater elements 270 and a thermistor 272 for the similar purpose of maintaining a predetermined temperature of the type bars 50, 52. The blocks 222 and 242 are separated by a layer 274 of insulation like asbestos so as to enable the temperatures of the platens 162, 164 and the type bars 44, 46 to be independently controlled. Similarly, a layer 276 of insulation like asbestos is positioned between the blocks 224 and 246 so as to enable the temperatures of the platens 162, 164 and the grating bars 50, 52 to be independently controlled. A layer of asbestos (not shown) may also be positioned between the side frames 196, 198 and the blocks 222, 224, 242 and 246 to prevent heat loss and equalize temperatures therein. As shown in FIG. 7, the lower side 278 of the block 242 and the lower side 279 of block 246 lie in a horizontal plane which is spaced from the tops of the grating bars 44, 46, and grating bars 50, 52, respectively, by a distance of about 0.010 inch for the embodiment shown, and extend over the gratings on both sets of grating bars.

As alluded to earlier herein, the stripper means 66 shown in FIGS. 1, 7 and 9 facilitate the removal of the length 32 of tape after it is embossed at the embossing station 28, as the length 32 has a tendency to stick to the grating bars 44, 46, 50 and 52 after the embossing operation. The stripper means 66 includes a plate 280 of about .020 inch thickness having a neck portion 282 which extends between adjacent grating bars like 44, 50, and 52 which plate has a notched out portion 284 to produce bent over contact areas or ears 286 and 288. One plate 280 is provided between each adjacent two grating bars 44, 46, 50 and 52 and each plate 280 is mounted on a pair of spaced rods 290 and 292 and a center rod 294 (FIG. 7). The spaced rods 290 and 292 are mounted in elongated slots 296, 298 respectively (FIG. 9) in spaced, opposed, parallel, stationary frame members 112 (only one of which is shown) which permit the rods and plates 280 to reciprocate in only a vertical direction as viewed in FIG. 9. The rods 290 and 292 and associated plates 280 are resiliently biased in an upward direction (as viewed in FIG. 9) by a set of tension-type springs 302 which are secured to the frame member 112 and first ends of rods 290, 292, and whose opposite or second ends utilize a similar set of associated springs 302 (not shown but which operate in the same manner). The rod 294 passes through an elongated, slot 304 in each of the plates 280 to permit only vertical, reciprocal movement of the plates 280 (as indicated by arrow 306 in FIG. 9), and the ends of the horizontally aligned rod 294 are secured in holes 308 in frame members 112. A metal plate 310 is positioned adjacent to the grating bar 44 and a layer of insulation 312 is positioned between the plate 310 and a block 314 (secured to side frame 112) so as to prevent a heat loss from grating bar 44 to the side frame 112 as shown in FIGS. 1 and 9.

When the platen means 62 is lowered by the platen actuating means 60, a pair of shoulders 316, 318 (FIG. 7) on each platen 162, 164 contact the ears 288, 286 of the associated stripper plate 280, thereby lowering it to enable the face 320 of each platen 162, 164 to engage the layer 64 (FIG. 1) of plastic material and force the length 32 of reflective material underneath into embossing engagement with the diffraction gratings, like 80, 82, positioned at the embossing line 30. When the platen means 62 is moved away from the embossing station, the embossed length 32 has a tendency to stick to the grating bars 44, 46, 50, 52, due to a vacuum being created during the embossing operation. However, the stripper plates 280 move upwardly (as viewed in FIG. 7) under the urging of springs 302, to strip the length 32 from the grating bars. The layer 64 of plastic material has one end thereof connected to the side frame 112 and extends along the embossing line 30 to overlie the complete length 32 to be embossed. The platens 162, 164 are biased upwardly (as viewed in FIG. 7) by a pair of springs 320, each having one end secured to an opposed end of the rod 184 and the remaining end secured to one of the frames 196, 198. When the platens 162, 164 are in the up or first position shown in FIGS. 7 and 8, they are urged upwardly by the rod 184 against the bias of springs 182, 176. When the "U"-shaped member 166 is lowered as previously described, the platens 162, 164 (after contacting the layer 64 during embossing) move upwardly relative to the rod 184 to compress the springs 182, 176 during the embossing operation. Because each platen 162, 164 has its own associated spring 176, 182, the individual platens can seat evenly upon the associated diffraction grating master on the grating bars like 44, 46 to produce a distinct diffraction grating or gratings on the length 32 of plastic material. In order to facilitate the embossing, the platens 162, 164 are heated to a controlled temperature of approximately 220° F. by the heater elements 238, and the grating bars 44, 46, 50 and 52 are heated to a controlled temperature of approximately 325° F. by the heating elements 270. The layer 64 (FIG. 1) of plastic material which is about 0.005 inch in thickness and which overlies the length 32 of plastic material is a high temperature polymide plastic which can withstand temperatures up to 500° F.; it prevents the length 32 from being cut during the embossing operation due to a small misalignment which may exist between the particular platen 162, 164 and the associated grating on the grating bars. The layer 64 also provides a uniform pressure for effecting a perfect transfer of the grating patterns on the grating bar means 40, 42 to the length 32.

The operation of the apparatus 20 is as follows. After the platens 162, 164 and the grating bars 44, 46, 50 and 52 have been heated to the predetermined temperatures described to facilitate the embossing, the data to be embossed on the length 32 is entered upon keyboard entry means 68 which may include a program to conventionally produce a series of numbers to be coded on the length 32. After an energizing key on the entry means 68 is actuated, the control processing unit 72 controls the operation of the apparatus 20. Such control includes the feeding of a length 32 of material to the embossing station 28 by the tape supply means 34. While the length 32 of material is being fed, the first and second indexing means 54, 56 are actuated causing the actuating linkage like 126 (FIG. 6) to move the associated grating bars 44, 46, 50 and 52 to the restored positions as shown for example in FIG. 1, whereupon they are urged by the associated springs 124 and linkage 126 in opposed relationship at a constant velocity towards the embossing line 30. Selection circuitry associated with the encoding means 70, the detecting means 154, and the control processing unit 72 then selects the positions at which the grating bars will be stopped to position the selected diffraction grating like 80, 82 at the embossing line 30 in accordance with the data to be embossed on the length 32 of material, although the number and types of characters can be changed to suit a particular application. After the grating bars 44, 46, 50 and 52 are positioned at the embossing line 30, the platen means 62 is actuated by the platen actuating means 60 to emboss the length 32 as previously described. Each of the platens 162, 164 forces the length 32 of tape into engagement with the diffraction gratings on the grating bars for an interval of one-tenth second at a pressure of about 7000 pounds per square inch. After embossing, the platen means 62 is raised, and a new length 32 of material is fed to the embossing station, and the embossing process is repeated. As the length 32 which was just embossed passes the reading means 74 (FIGS. 1 and 4), the data which was just embossed thereon is read and compared with what was entered upon the keyboard entry means 68 by the comparator means 76 as previously described. After the take up reel 38 is full, the lengths 32 of material are then cut into strips 22 to be embedded in a credit card 24 (FIG. 2) as previously described.

The method for embossing diffraction gratings on a length 32 of deformable material or tape has already been described in relation to the apparatus 20, however some additional clarification shall follow.

The discussion with regard to FIGS. 1 and 5 particularly, illustrates how the diffraction gratings 80, 82 are formed on the first and second groups 40, 42 of grating bar means in accordance with a particular code, as was described earlier herein. The gratings like 80, 82 are aligned with regard to the reference line 84, so as to be aligned with regard to the reading means 74 when they are eventually embossed on a length 32 of material. There are two types of control gratings on the bar means 44, 46, 50, 52. One type is the "C" grating marked 80 in FIGs. 1 and 4 which represents the start and end of data, and the diffraction grating marked with an "S" and also numbered 88 in FIGS. 1 and 4 which represents a space or clocking pulse between data. From FIG. 4, it is apparent two successive diffraction gratings representing data like 82, as viewed along the embossing line 30, are separated by a diffraction grating 88 corresponding to a space or clocking pulse. The control gratings including both gratings 80 and 88 and the data gratings like 82, 86 are produced on the thin sheet 94 (FIG. 5) of metal by the techniques disclosed in said copending application, Ser. No. 611,377, which is incorporated by reference herein. A plurality of grating bar means like 44, 46, 50 and 52 are similarly formed, with there being one grating bar means 44 with the control grating 80 thereon (FIG. 4), several bar means like 46 and 50, and one bar means 52 having only the control gratings 80 thereon. When positioned in the relationship shown in FIG. 4, fifteen data characters can be selected so that selected ones of the diffraction gratings can be positioned at the embossing line 30. The length 32 of deformable material or tape is also positioned at the embossing line 30 as previously explained, and is laterally retained thereat by the stripper means 66. Thereafter, the length 32 of tape is forced into engagement with the grating masters positioned at the embossing line 30 by the platen and heater assembly 58 to emboss the length 32 of tape. The pressure on the length 32 of tape is effected by the individual platens 162, 164 as previously described, and the thin layer 64 of plastic material positioned between the individual platens 162, 164 enables a more uniform application of pressure and prevents cutting of the length 32 of tape due to inaccuracies of alignment of the individual platens 162, 164 with the diffraction grating masters positioned at the embossing line 30.

What is claimed is:

1. An apparatus for producing diffraction gratings on a length of reflective deformable material in conformance with a predetermined code, said diffraction gratings including data gratings and control gratings, said apparatus comprising:

an embossing station having an embossing line thereat;

a plurality of bar means, with each said bar means having grating masters thereon;

each said bar means having a length which is long in relation to its width and having the associated grating masters oriented thereon in a predetermined direction;

said plurality of bar means including first and second groups of said bar means in which said grating masters on each said bar means comprise data grating masters and control grating masters which are aligned along the length of the associated bar means with one control grating master being in side by side relationship with each said data grating master;

means for indexing said first and second groups of bar means in opposed advancing and receding relationship to each other and in a direction which is perpendicular to said embossing line so as to position selected ones of said grating masters at said embossing line so that one of said control grating masters is positioned between each two successive said data grating masters at said embossing line;

means for indexing a length of said reflective deformable material along said embossing line; and platen means including a platen for each said bar means for forcing said length of reflective deformable material into engagement with the grating masters which are selectively positioned at said embossing line to form said diffraction gratings on said length of reflective deformable material in conformance with said code.

2. The apparatus as claimed in claim 1 further comprising a strip of deformable plastic material about 0.005 inch thick positioned between said length of reflective deformable material and said platen means along said embossing line to equalize the pressure on said platens.

3. The apparatus as claimed in claim 2 in which said platen means includes first and second heater means for respectively heating said plurality of bar means and said platen means to predetermined temperatures of approximately 325° F. and 220° F., respectively; and said platen means includes actuating means for moving said platens between first and second positions,
  said first heater means being spaced from but close to said plurality of bar means so as to heat said plurality of bar means, and said second heater means being located on opposed sides of said platens so as to heat said platens to said predetermined temperature; and
  said actuating means being effective to move said platens to said second position to thereby force said length of reflective deformable material into engagement with said grating masters which are positioned at said embossing line.

4. The apparatus as claimed in claim 3 in which said reflective deformable material is made of plastic of about 0.002 inch in thickness and which has a layer of reflective material on one side thereof and is oriented at said embossing line so that said layer of reflective metal faces said grating masters positioned thereat.

5. The apparatus as claimed in claim 3 in which said embossing station includes:
  stripper means which align said length of reflective deformable material along said embossing line and which facilitate the removal thereof after embossing;
  said stripper means comprising a plurality of stripper plates, with one such stripper plate being positioned between each two adjacent said bar means, and resilient means for urging said stripper plates towards said platens, each said platen having opposed shoulders thereon;
  each said stripper plate having opposed ears thereon to engage said opposed shoulders on an associated said platen.

6. An apparatus for automatically producing diffraction gratings on a length of reflective deformable material in conformance with a predetermined code, said diffraction gratings including data gratings and control gratings, said apparatus comprising:
  keyboard means for entering data thereon;
  an embossing station having an embossing line thereat;
  a plurality of bar means, with each said bar means having grating masters thereon;
  each said bar means having a length which is long in relation to its width and having the associated grating masters oriented thereon in a predetermined direction;
  said plurality of bar means including first and second groups of said bar means in which said grating masters on each said bar means comprise data grating masters and control grating masters in conformance with said predetermined code and which are aligned along the length of the associated bar means with one control grating master being in side by side relationship with each said data grating master;
  control means;
  means for indexing said first and second groups of bar means in opposed advancing relationship to each other and in a direction which is perpendicular to said embossing line so as to position selected ones of said grating masters at said embossing line in response to said control means and said data entered on said keyboard means, so that one of said control grating masters is positioned between each two successive said data grating masters at said embossing line;
  means for indexing a length of said reflective deformable material along said embossing line in response to said control means; and
  platen means including a platen for each said bar means for forcing said length of reflective deformable material into engagement with the grating masters which are selectively positioned at said embossing line in response to said control means to form said diffraction gratings on said length of reflective deformable material in conformance with said code and said data entered on said keyboard means.

7. The apparatus as claimed in claim 6 further comprising a strip of deformable plastic material about 0.005 inch thick positoned between said length of reflective deformable material and said platen means along said embossing line to equalize the pressure on said platens.

8. The apparatus as claimed in claim 7 in which said platen means includes first and second heater means for respectively heating said plurality of bar means and said platen means to predetermined temperatures of approximately 325° F. and 220° F., respectively.

9. A method of embossing a plurality of diffraction gratings corresponding to character data and control data on a length of deformable tape in conformance with a predetermined code comprising:
  a. forming a plurality of data diffraction gratings and control diffraction gratings on a bar means having a length and a width so that said data diffraction gratings and control diffraction gratings are positioned along the length of said bar means in side by side relationship with one control diffraction grating being provided for each said data diffraction grating;
  b. forming a plurality of said bar means and separating them into first and second groups;
  c. mounting said first and second groups of bar means in side by side relationship so that when viewed in a direction which is perpendicular to the lengths of said bar means, any two successive data diffraction gratings will be separated by a control diffraction grating;
  d. positioning said first and second groups of bar means by indexing said first and second groups of bar means in opposed advancing and receding relationship to each other so as to align selected ones of said data and control diffraction gratings at an embossing line which is perpendicular to the lengths of said bar means;
  e. positioning a length of deformable tape along said embossing line; and
  f. forcing said length of deformable tape into engagement with the selected ones of said diffraction gratings at said embossing line by use of separate platens for each said bar means to thereby emboss said length of deformable tape.

10. The method as claimed in claim 9 in which said forcing step is further effected by heating to a predetermined temperature said platens and resiliently urging each said platen into engagement with said length of deformable tape to thereby emboss it.

11. The method as claimed in claim 10 in which said length of deformable tape has one side thereof which has reflective material thereon, and said positioning step is effected by positioning the reflective side of said length of deformable material so as to face said bar means.

12. The method as claimed in claim 11 in which said forcing step is effected by positioning a thin layer of resilient plastic material about 0.005 inch thick between sad length of deformable tape and said platens along said embossing line to equalize the pressure on said platens.

* * * * *

UNITED STATES PATENT OFFICE
CERTIFICATE OF CORRECTION

Patent No. 4,072,098                    Dated February 7, 1978

Inventor(s) Robert H. Granzow and Richard P. Marvin

It is certified that error appears in the above-identified patent and that said Letters Patent are hereby corrected as shown below:

Column 13, line 67, after "advancing" should be --and receding--.

Column 14, line 65, "further" should be deleted.

Signed and Sealed this

Twenty-fifth Day of July 1978

[SEAL]

Attest:

RUTH C. MASON
Attesting Officer

DONALD W. BANNER
Commissioner of Patents and Trademarks